United States Patent [19]
Chatterjee et al.

[11] Patent Number: 5,839,370
[45] Date of Patent: *Nov. 24, 1998

[54] FLEXIBLE ZIRCONIA ALLOY CERAMIC LITHOGRAPHIC PRINTING TAPE AND METHOD OF USING SAME

[75] Inventors: Dilip K. Chatterjee; Syamal K. Ghosh, both of Rochester, N.Y.

[73] Assignee: Eastman Kodak Company, Rochester, N.Y.

[ * ] Notice: The term of this patent shall not extend beyond the expiration date of Pat. No. 5,743,188.

[21] Appl. No.: 844,292

[22] Filed: Apr. 18, 1997

[51] Int. Cl.$^6$ ....................................................... B41C 1/10
[52] U.S. Cl. ........................... 101/467; 101/453; 101/478; 430/302
[58] Field of Search ............................... 101/450.1, 451, 101/453, 454, 458, 459, 456, 463.1, 465–467, 478; 430/302, 945

[56] References Cited

U.S. PATENT DOCUMENTS

| | | | |
|---|---|---|---|
| 3,506,779 | 4/1970 | Brown et al. | 101/467 |
| 3,549,733 | 12/1970 | Caddell | 101/401.1 |
| 3,574,657 | 4/1971 | Burnett | 101/465 |
| 3,654,864 | 4/1972 | Ovshinsky | 101/467 |
| 3,793,033 | 2/1974 | Mukherjee | 101/456 |
| 3,832,948 | 9/1974 | Barker | 101/401.1 |
| 3,945,318 | 3/1976 | Landsman | 101/467 |
| 3,962,513 | 6/1976 | Eames | 101/463.1 |
| 3,964,389 | 6/1976 | Peterson | 101/467 |
| 4,034,183 | 7/1977 | Uhlig | 219/121.85 |
| 4,054,094 | 10/1977 | Caddell | 101/467 |
| 4,081,572 | 3/1978 | Pacansky | 101/467 |
| 4,334,006 | 6/1982 | Kitajima | 430/254 |
| 4,687,729 | 8/1987 | Cadwell et al. | 101/463.1 |
| 4,693,958 | 9/1987 | Schwartz | 430/302 |
| 4,703,024 | 10/1987 | Aronov | 501/103 |
| 4,718,340 | 1/1988 | Love, III | 101/467 |
| 4,731,317 | 3/1988 | Fromson | 430/159 |
| 4,769,310 | 9/1988 | Gugger et al. | 430/346 |
| 4,794,680 | 1/1989 | Meyerhoff et al. | 492/365 |
| 4,846,065 | 7/1989 | Mayrhofer et al. | 101/453 |
| 4,967,663 | 11/1990 | Metcalf | 101/348 |
| 5,045,697 | 9/1991 | Schneider | 347/224 |
| 5,238,778 | 8/1993 | Hirai | 101/467 |
| 5,272,120 | 12/1993 | Kosuda et al. | 501/105 |
| 5,290,332 | 3/1994 | Chatterjee et al. | 65/18.1 |
| 5,293,817 | 3/1994 | Nussel et al. | 101/453 |
| 5,317,970 | 6/1994 | Nussel et al. | 101/478 |
| 5,336,282 | 8/1994 | Ghosh et al. | 51/309 |
| 5,345,869 | 9/1994 | Treverton et al. | 101/454 |
| 5,353,705 | 10/1994 | Lewis | 101/453 |
| 5,358,913 | 10/1994 | Chatterjee et al. | 501/103 |
| 5,378,580 | 1/1995 | Leenders | 430/303 |
| 5,385,092 | 1/1995 | Lewis | 101/467 |
| 5,395,729 | 3/1995 | Reardon | 430/200 |
| 5,454,318 | 10/1995 | Hirt et al. | 101/453 |
| 5,543,269 | 8/1996 | Chatterjee et al. | 430/346 |
| 5,555,809 | 9/1996 | Hirt et al. | 101/451 |
| 5,713,287 | 2/1998 | Gelbart | 101/478 |

FOREIGN PATENT DOCUMENTS

| | | |
|---|---|---|
| 0 001 068 | 3/1979 | European Pat. Off. . |
| 0 531 878 A1 | 3/1993 | European Pat. Off. . |
| 0 573 091 | 12/1993 | European Pat. Off. . |
| 693 371 | 1/1996 | European Pat. Off. . |
| 44 42 235 A1 | 6/1995 | Germany . |

*Primary Examiner*—Stephen R. Funk
*Attorney, Agent, or Firm*—J. Lanny Tucker

[57] ABSTRACT

Flexible and reusable lithographic printing tapes are prepared from a zirconia ceramic that is an alloy of $ZrO_2$ and a second oxide chosen from MgO, CaO, $Y_2O_3$, $Sc_2O_3$, a rare earth oxide or a combination of any of these. These printing tapes have an average thickness of less than about 5 mm. In use, a surface of the zirconia alloy ceramic printing tape is imagewise exposed to electromagnetic radiation which transforms it from a lydrophilic to an oleophilic state or from an oleophilic to a hydrophilic state, thereby creating a lithographic printing surface which is hydrophilic in non-image areas and is oleophilic and thus capable of accepting printing ink in image areas. Such inked areas can then be used to transfer an image to a suitable substrate in lithographic printing. These printing tapes are directly laser-imageable as well as image erasable.

21 Claims, 1 Drawing Sheet

FLEXIBLE ZIRCONIA ALLOY CERAMIC LITHOGRAPHIC PRINTING TAPE AND METHOD OF USING SAME

RELEVANT APPLICATIONS

Copending and commonly assigned U.S. Ser. No. 08/576, 178, filed Dec. 21, 1995, by Ghosh et al, now U.S. Pat. No. 5,743,188, based on Provisional application 60/005729, filed Oct. 20, 1995.

Copending and commonly assigned U.S. Ser. No. 08/844, 348, filed on even date herewith by Chatterjee, Ghosh and Nüssel, as a CIP of U.S. Ser. No. 08/576,178, noted above, and entitled "Zirconia Alloy Cylinders and Sleeves for Imaging and Lithographic Printing Methods".

Copending and commonly assigned U.S. Ser. No. 08/843, 522, filed on even date herewith by Chatterjee, Ghosh and Korn, and entitled "Method of Controlled Laser Imaging of Zirconia Alloy Ceramic Lithographic Member to Provide Localized Melting in Exposed Areas".

FIELD OF THE INVENTION

This invention relates in general to lithography and in particular to new and improved lithographic printing tape or web. More specifically, this invention relates to novel flexible webs or tapes that are readily imaged and then useful for lithographic printing. This invention also relates to methods of imaging and lithographic printing using the printing tape of this invention.

BACKGROUND OF THE INVENTION

The art of lithographic printing is based upon the immiscibility of oil and water, wherein the oily material or ink is preferentially retained by the image area and the water or fountain solution is preferentially retained by the non-image area. When a suitably prepared surface is moistened with water and an ink is then applied, the background or non-image area retains the water and repels the ink while the image area accepts the ink and repels the water. The ink on the image area is then transferred to the surface of a material upon which the image is to be reproduced, such as paper, cloth and the like. Commonly the ink is transferred to an intermediate material called the blanket, which in turn transfers the ink to the surface of the material upon which the image is to be reproduced.

Aluminum has been used for many years as a support for lithographic printing plates. In order to prepare the aluminum for such use, it is typical to subject it to both a graining process and a subsequent anodizing process. The graining process serves to improve the adhesion of the subsequently applied radiation-sensitive coating and to enhance the water-receptive characteristics of the background areas of the printing plate. The graining affects both the performance and the durability of the printing plate, and the quality of the graining is a critical factor determining the overall quality of the printing plate. A fine, uniform grain that is free of pits is essential to provide the highest quality performance.

Both mechanical and electrolytic graining processes are well known and widely used in the manufacture of lithographic printing plates. Optimum results are usually achieved through the use of electrolytic graining, which is also referred to in the art as electrochemical graining or electrochemical roughening, and there have been a great many different processes of electrolytic graining proposed for use in lithographic printing plate manufacturing. Processes of electrolytic graining are described in numerous references.

In the manufacture of lithographic printing plates, the graining process is typically followed by an anodizing process, utilizing an acid such as sulfuric or phosphoric acid, and the anodizing process is typically followed by a process which renders the surface hydrophilic such as a process of thermal silication or electrosilication. The anodization step serves to provide an anodic oxide layer and is preferably controlled to create a layer of at least 0.3 g/m$^2$. Processes for anodizing aluminum to form an anodic oxide coating and then hydrophilizing the anodized surface by techniques such as silication are very well known in the art, and need not be further described herein.

Illustrative of the many materials useful in forming hydrophilic barrier layers are polyvinyl phosphonic acid, polyacrylic acid, polyacrylamide, silicates, zirconates and titanates.

The result of subjecting aluminum to an anodization process is to form an oxide layer which is porous. Pore size can vary widely, depending on the conditions used in the anodization process, but is typically in the range of from about 0.1 to about 10 μm. The use of a hydrophilic barrier layer is optional but preferred. Whether or not a barrier layer is employed, the aluminum support is characterized by having a porous wear-resistant hydrophilic surface which specifically adapts it for use in lithographic printing, particularly in situations where long press runs are required.

A wide variety of radiation-sensitive materials suitable for forming images for use in the lithographic printing process are known. Any radiation-sensitive layer is suitable which, after exposure and any necessary developing and/or fixing, provides an area in imagewise distribution which can be used for printing.

Useful negative-working compositions include those containing diazo resins, photocrosslinkable polymers and photopolymelizable compositions. Useful positive-working compositions include aromatic diazooxide compounds such as benzoquinone diazides and naphthoquinone diazides.

Lithographic printing plates of the type described hereinabove are usually developed with a developing solution after being imagewise exposed. The developing solution, which is used to remove the non-image areas of the imaging layer and thereby reveal the underlying porous hydrophilic support, is typically an aqueous alkaline solution and frequently includes a substantial amount of organic solvent. The need to use and dispose of substantial quantities of alkaline developing solution has long been a matter of considerable concern in the printing art.

Efforts have been made for many years to manufacture a printing plate which does not require development with an alkaline developing solution. Examples of the many references relating to such prior efforts include, among others: U.S. Pat. No. 3,506,779 (Brown et al), U.S. Pat. No. 3,549,733 (Caddell), U.S. Pat. No. 3,574,657 (Burnett), U.S. Pat. No. 3,793,033 (Mukherjee), U.S. Pat. No. 3,832,948 (Barker), U.S. Pat. No. 3,945,318 (Landsman), U.S. Pat. No. 3,962,513 Eames), U.S. Pat. No. 3,964,389 (Peterson), U.S. Pat. No. 4,034,183 (Uhlig), U.S. Pat. No. 4,054,094 (Caddell et al), U.S. Pat. No. 4,081,572 (Pacansky), U.S. Pat. No. 4,334,006 (Kitajima et al), U.S. Pat. No. 4,693,958 (Schwartz et al), U.S. Pat. No. 4,731,317 (Fromson et al), U.S. Pat. No. 5,238,778 (Hirai et al), U.S. Pat. No. 5,353,705 (Lewis et al), U.S. Pat. No. 5,385,092 (Lewis et al), U.S. Pat. No. 5,395,729 (Reardon et al), EP-A-0 001 068, and EP-A-0 573 091.

Lithographic printing plates designed to eliminate the need for a developing solution which have been proposed heretofore have suffered from one or more disadvantages which have limited their usefulness. For example, they have lacked a sufficient degree of discrimination between oleophilic image areas and hydrophilic non-image areas with the result that image quality on printing is poor, or they have had oleophilic image areas which are not sufficiently durable to permit long printing runs, or they have had hydrophilic non-image areas that are easily scratched and worn, or they have been unduly complex and costly by virtue of the need to coat multiple layers on the support.

The lithographic printing plates described hereinabove are printing plates which are employed in a process which employs both a printing ink and an aqueous fountain solution. Also well known in the lithographic printing art are so-called "waterless" printing plates which do not require the use of a fountain solution. Such plates have a lithographic printing surface comprised of oleophilic (ink-accepting) image areas and oleophobic (ink-repellent) background areas. They are typically comprised of a support, such as aluminum, a photosensitive layer which overlies the support, and an oleophobic silicone rubber layer which overlies the photosensitive layer, and are subjected to the steps of imagewise exposure followed by development to form the lithographic printing surface.

While such materials have considerable utility, conventional printing plates are generally useful only once, that is for printing a single image. There are some "erasable" plates that can be reused, but they have not gained high acceptance for a number of reasons. It would be desirable to have a means for printing multiple and varied images "on the same job" using a single printing member.

SUMMARY OF THE INVENTION

In accordance with this invention, a flexible lithographic printing tape has a printing surface composed of a zirconia ceramic that is an alloy of $ZrO_2$ and a secondary oxide selected from the group consisting of MgO, CaO, $Y_2O_3$, $Sc_2O_3$, a rare earth oxide, and combinations thereof, the zirconia alloy ceramic having a density of from about 5.6 to about 6.2 $g/cm^3$, and the printing tape having an average thickness of less than about 5 mm.

This invention also provides a method of imaging comprising the steps of:

A) providing the flexible lithographic printing tape described above, and

B) providing an image on the printing tape by imagewise exposing the printing surface to electromagnetic radiation that transforms the printing surface from a hydrophilic to an oleophilic state or from an oleophilic to a hydrophilic state, thereby creating a lithographic printing surface having both image areas and non-image areas.

Moreover, this invention provides a method of lithographic printing, comprising the steps of:

A) providing the flexible lithographic printing tape described above,

B) providing an image on the printing tape by imagewise exposing the printing surface to electromagnetic radiation that transforms the printing surface from a hydrophilic to an oleophilic state or from an oleophilic to a hydrophilic state, thereby creating a lithographic printing surface having both image areas and non-image areas, C) contacting the lithographic printing surface with an aqueous fountain solution and with a lithographic printing ink, thereby forming an inked lithographic printing surface, and D) contacting the inked lithographic printing surface with a substrate to thereby transfer the printing ink to said substrate, forming an image thereon.

Such printing methods can also include additional steps of cleaning off the ink from the printing surface, erasing the image thereon, and reimaging the printing tape, as described below. In such fashion, the invention can be used to provide a reusable lithographic printing tape.

The printing tape (or web) of this invention has a number of advantages. For example, no chemical processing is required so that the effort, expense and environmental concerns associated with the use of aqueous alkaline developing solutions are avoided. Post-exposure baking or blanket exposure to ultraviolet or visible light sources, as are commonly employed with many lithographic printing plates, are not required. Imagewise exposure of the printing tape can be carried out directly with a focused laser beam which converts the ceramic surface from a hydrophilic to an oleophilic state or from an oleophilic to a hydrophilic state. Exposure with a laser beam enables the printing tape to be prepared directly from digital data without the need for intermediate films and conventional time-consuming optical printing methods. Since no chemical processing, wiping, brushing, baking or treatment of any kind is required, it is feasible to expose the printing tape directly on the printing press by equipping the press with a laser exposing device and suitable means for controlling the position of the laser exposing device. A still further advantage is that the printing tape is well adapted to function with conventional fountain solutions and conventional lithographic printing inks so that no novel or costly chemical compositions are required.

The printing tapes of this invention, in the form of a continuous web, enable a user to use different segments of the tape for different images. The tape would therefore provide continuity within the "same printing job" even if the images differed. The user need not interrupt the work to change conventional printing plates in order to provide different printed images. The printing tapes of this invention are also designed to be "erasable" as described below, that is the images can be erased and the printing tapes reused.

The zirconia alloy ceramic utilized in this invention has many characteristics which render it especially beneficial for use in lithographic printing. Thus, for example, the ceramic surface is extremely durable, abrasion-resistant, and long wearing. Lithographic printing tapes utilizing this surface are capable of producing a virtually unlimited number of copies, for example, press runs of up to several million. On the other hand, since very little effort is required to prepare the tape for printing, it is also well suited for use in very short press runs for the same or different images. Discrimination between oleophilic image areas and hydrophilic non-image areas is excellent so that image quality on printing is unsurpassed. The printing tape is generally flexible or semi-rigid, and in a continuous web of any desired length. Its use is fast and easy to carry out, image resolution is very high and imaging is especially well suited to images that are electronically captured and digitally stored.

The lithographic printing tapes utilized in this invention exhibit exceptional long-wearing characteristics that greatly exceed those of the conventional grained and anodized aluminum printing plates.

A further particular advantage of lithographic printing tapes prepared from zirconia alloy ceramics as described herein is that, unlike conventional lithographic printing plates, they are erasable and reusable. Thus, for example, after the printing ink has been removed from the printing surface using known devices and procedures, the oleophilic image areas of the printing surface can be erased by thermally-activated oxidation or by laser-assisted oxidation. Accordingly, the printing tape can be imaged, erased and re-imaged repeatedly, in the same or a different segment of the tape.

The use of zirconia alloy ceramics as directly laser-imageable, erasable printing members in "direct-to-plate" applications has not been heretofore disclosed, and represents an important advance in the lithographic printing art.

DETAILED DESCRIPTION OF THE INVENTION

Figure 1:
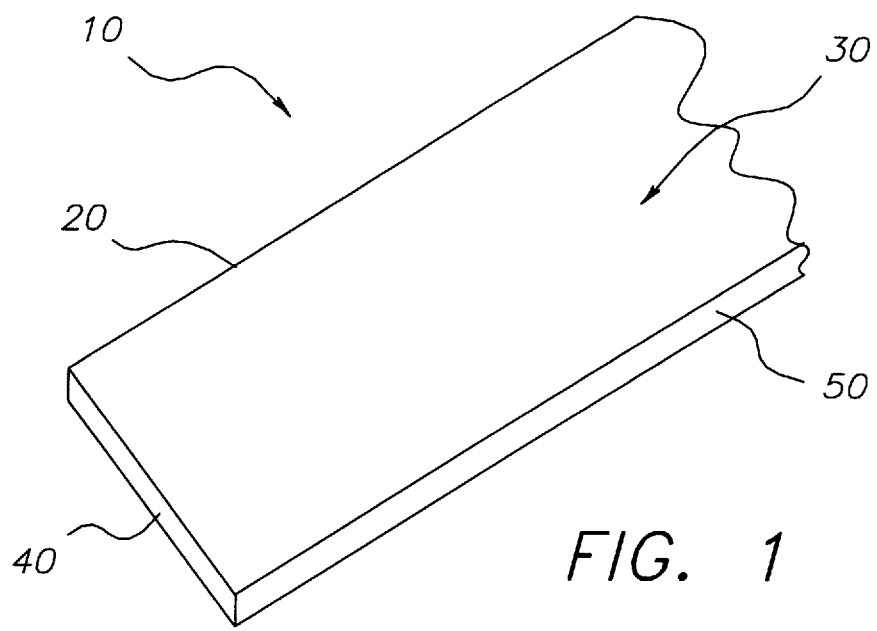
FIG. 1 is a highly schematic isometric partial view of a printing tape of this invention that is composed entirely of a web of a non-porous zirconia ceramic.

A zirconia alloy ceramic of stoichiometric composition is hydrophilic. Transforming it from a stoichiometric composition to a substoichiometric composition changes from hydrophilic to oleophilic. Thus, in one embodiment of this invention, the lithographic printing tape comprises a hydrophilic zirconia alloy ceramic of stoichiometric composition, and imagewise exposure (usually with infrared irradiation) converts it to an oleophilic substoichiometric composition in the exposed regions (image areas), leaving non-exposed (background) areas hydrophilic.

In an alternative embodiment of the invention, the lithographic printing tape comprises an oleophilic zirconia alloy ceramic of substoichiometric composition, and imagewise exposure (usually with visible radiation) converts it to a hydrophilic stoichiometric composition in the exposed regions. In this instance, the exposed regions serve as the background (or non-image areas) and the unexposed regions serve as the image areas.

The hydrophilic zirconia alloy ceramic is a stoichiometric oxide, $ZrO_2$, while the oleophilic zirconia alloy ceramic is a substoichiometric oxide, $ZrO_{2-x}$. The change from a stoichiometric to a substoichiometric composition is achieved by reduction while the change from a substoichiometric composition to a stoichiometric composition is achieved by oxidation.

In a preferred embodiment of the invention, the lithographic printing tape is comprised of an alloy of zirconium oxide ($ZrO_2$) and a secondary oxide selected from the group consisting of MgO, CaO, $Y_2O_3$, $Sc_2O_3$, rare earth oxides (such as $Ce_2O_3$, $Nd_2O_3$ and $Pr_2O_3$), and combinations or mixtures of any of these secondary oxides. The secondary oxide can also be referred to as a dopant. The preferred dopant is $Y_2O_3$. Thus, a zirconia-yttria alloy ceramic is most preferred.

The molar ratio of secondary oxide (dopant) to zirconium oxide preferably ranges from about 0.1:99.9 to about 25:75, and is more preferably from about 0.5:99.5 to about 5:95. The dopant is especially beneficial in promoting the transformation of the high temperature stable phase of zirconia oxide (particularly, the tetragonal phase) to the metastable state at room temperature. It also provides improved properties such as, for example, high strength, and enhanced fracture toughness. The alloys described above have superior resistance to wear, abrasion and corrosion.

The zirconia alloy ceramic utilized in this invention can be effectively converted from a hydrophilic to an oleophilic state by exposure to infrared radiation at a wavelength of about 1064 nm (or 1.064 $\mu$m). Radiation of this wavelength serves to convert a stoichiometric oxide that is strongly hydrophilic, to a substoichiometric oxide that is strongly oleophilic by promoting a reduction reaction. The use for this purpose of Nd:YAG lasers that emit at 1064 nm is especially preferred.

Conversion from an oleophilic to a hydrophilic state can be effectively achieved by exposure to visible radiation with a wavelength of 488 nm (or 0.488 $\mu$m). Radiation of this wavelength serves to convert the substoichiometric oleophilic oxide to the stoichiometric hydrophilic oxide by promoting an oxidation reaction. Argon lasers that emit at 488 nm are especially preferred for this purpose, but carbon dioxide lasers irradiating in the infrared (such as 10600 nm or 10.6 $\mu$m) are also useful. In addition, heating the substoichiometric oxide at from about 150° to about 250° C. can also convert the oxide to a stoichiometric state.

In addition, the zirconia ceramics useful in preparing the printing tapes of this invention have a little porosity, that is generally up to about 2%, and preferably from about 0.2 to about 2%. The density of the material is generally from about 5.6 to about 6.2 g/cm$^3$, and preferably from about 6.03 to about 6.06 g/cm$^3$ (for the preferred zirconia-yttria allow having 3 mol % yttria). Generally, they have a grain size of from about 0.1 to about 0.6 $\mu$m, and preferably from about 0.2 to about 0.5 $\mu$m.

The ceramic printing tapes have an average thickness of from about 0.5 to about 5 mm, and preferably from about 1 to about 3 mm. A thickness of about 2 mm provides optimum flexibility and strength. The printing tapes can be formed either on a rigid or semi-rigid substrate to form a composite with the ceramic providing a printing surface, or they can be in monolithic form.

The printing tapes of this invention can have a surface that is highly polished (as described below), or be textured using any conventional texturing method (chemical or mechanical). In addition, glass beads can be incorporated into the ceramic to provide a slightly textured or "matted" printing surface.

The zirconia alloys referred to herein and methods for manufacturing zirconia ceramic articles having high densities (identified above) sing very fine (0.1 to 0.6 mm grain size) zirconia alloy powders are described in U.S. Pat. No. 5,290,332 (Chatterjee et al), U.S. Pat. No. 5,336,282 (Ghosh et al) and U.S. Pat. No. 5,358,913 (Chatterjee et al), the disclosures of which are incorporated herein by reference. A certain level of porosity (described above) is provided in the printing tapes to render them sufficiently flexible. The resolution of laser written images on zirconia ceramic surfaces depends not only on the size of the laser spot and its interaction with the material, but on the density and grain size of the zirconia. The zirconia ceramics described in the noted patents are especially effective for use in lithographic printing because of their high density and fine grain size. The density and porosity of the ceramic printing tapes can also be varied by adjusting their consolidation parameters, such as pressure and sintering temperature.

The printing tape of this invention can be produced by thermal or plasma spray coating on a flexible substrate, by physical vapor deposition (PVD) or chemical vapor deposition (CVD) of zirconia or a zirconia alloy on a suitable semirigid or rigid substrate. In the case of PVD or CVD, the printing tapes can either be left on the substrate in the form of a composite, or they can be peeled off the substrate, or the substrate can be chemically dissolved away. Alternatively, the ceramic printing tapes can be formed by conventional methods such as slip casting, tape casting, dip coating and sol-gel techniques.

Thermal or plasma spray and CVD and PVD processes can be carried out either in air or in an oxygen environment to produce hydrophilic non-imaged printing surfaces. Whereas if these processes are carried out in an inert atmosphere, such as in argon or in nitrogen, the printing surfaces thus produced would be oleophilic in nature. The printing tapes prepared by other conventional methods require sintering of the "green" tapes at a suitable high temperature (such as 1200° to 1600° C.) for a suitable time (1 to 3 hours), in air, oxygen or an inert atmosphere.

For use in this invention, the printing surface of the zirconia or zirconia alloy ceramic can be thermally or mechanically polished, or it can be used in the "as sintered", "as coated", or "as sprayed" form, as described above. Preferably, the printing surface is polished to an average roughness of less than about 0.1 $\mu$m.

The zirconia utilized in this invention can be of any crystalline form or phase including the tetragonal, monoclinic and cubic crystalline forms, or mixtures of two or more of such forms or phases. The predominantly tetragonal form of zirconia is preferred because of its high fracture toughness. By predominantly is meant, 100% of the zirconia is of the tetragonal crystalline form. Conversion of zirconia from one form to another is well known in the art FIG. 1 illustrates one embodiment of a printing tape of this invention in a partial isometric view. Tape 10 is an elongated web 20 of zirconia ceramic that has printing surface 30, end 40 and edge 50 having a defined thickness (as described above). Such a web can be mounted on a suitable image setting machine or printing press, usually as supported by two or more rollers for use in imaging and/or printing.

Figure 2:
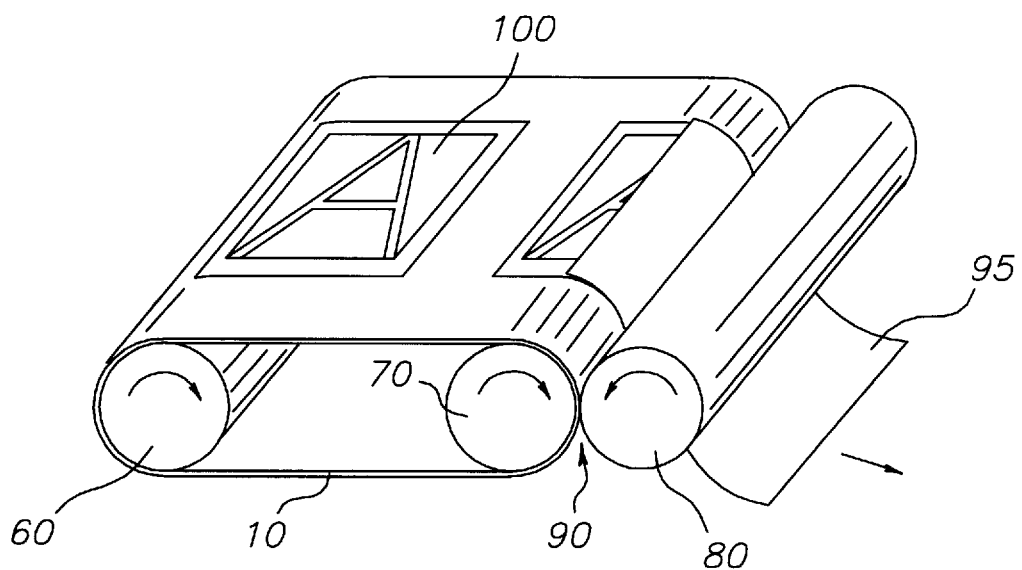
FIG. 2 is a highly schematic side view of a printing tape in a continuous web form, mounted on a set of rollers.

In a very simplified fashion, FIG. 2 schematically shows printing tape 10 supported by drive rollers 60 and 70. Drive roller 70 and backing roller 80 provide nip 90 through which paper sheet 95 or another printable substrate is passed after receiving the inked image 100 from tape 10. Such printing machines can also include laser imaging stations, inking stations, "erasing" stations, and other stations and components commonly used in lithographic printing.

The lithographic printing tapes of this invention can be imaged by any suitable technique on any suitable equipment, such as a plate setter or printing press. The essential requirement is imagewise exposure to radiation which is effective to convert the hydrophilic zirconia alloy ceramic to an oleophilic state or to convert the oleophilic zirconia alloy ceramic to a hydrophilic state. Thus, the tapes can be imaged by exposure through a transparency or can be exposed from digital information such as by the use of a laser beam. Preferably, the printing tapes are directly laser written. The laser, equipped with a suitable control system, can be used to "write the image" or to "write the background."

Zirconia alloy ceramics of stoichiometric composition are produced when sintering or thermal processing is carried out in air or an oxygen atmosphere. Zirconia alloy ceramics of substoichiometric composition are produced when sintering or thermal processing is carried out in an inert or reducing atmosphere.

Although zirconia alloy ceramics of any crystallographic form or mixtures of forms can be used in this invention, the preferred zirconia alloy ceramic is an alloy of zirconium oxide ($ZrO_2$) and yttrium oxide ($Y_2O_3$) of stoichiometric composition. The preferred molar ratio of yttria to zirconia is from about 0.5:99.5 to about 5.0:95.0. Such alloys are off-white in color and strongly hydrophilic. The action of the laser beam transforms the off-white hydrophilic zirconia alloy ceramic to black substoichiometric zirconia alloy ceramic which is strongly oleophilic. The off-white and black compositions exhibit different surface energies, thus enabling one region to be hydrophilic and the other oleophilic. The imaging of the printing surface is due to photoassisted reduction while image erasure is due to thermally-assisted reoxidation.

For imaging the zirconia alloy ceramic printing surface, it is preferred to utilize a high-intensity laser beam with a power density at the printing surface of from about $30\times10^6$ to about $850\times10^6$ watts/cm$^2$ and more preferably of from about $75\times10^6$ to about $425\times10^6$ watts/cm$^2$. However, any suitable exposure to electromagnetic radiation of an appropriate wavelength can be used in the practice of this invention.

An especially preferred laser for use in imaging the lithographic printing tape of this invention is an Nd:YAG laser that is Q-switched and optically pumped with a krypton arc lamp. The wavelength of such a laser is 1.064 $\mu$m.

Imaging can be accomplished in two ways: "ablation" whereby exposed portions of the printing surface are loosened removed or vaporized, and "melting" whereby the zirconia in the exposed portions of the printing surface are melted and not ablated.

For use in the hydrophilic to oleophilic conversion process by means of ablation, the following parameters are characteristic of a laser system that is especially useful.

Laser Power:
  Continuous wave average—0.1 to 50 watts preferably from 0.5 to 30 watts,
  Peak power (Q-switched)—6000 to $10^5$ watts preferably from 6000 to 70,000 watts,
  Power density—$30\times10^6$ W/cm$^2$ to $850\times10^6$ W/cm$^2$ preferably from $75\times10^6$ to $425\times10^6$ W/cm$^2$,
Spot size in TEM$_{00}$ mode=100 $\mu$m,
Current=15 to 24 amperes, preferably from 18 to 24 amperes,
Laser Energy=$6\times10^{-4}$ to $5.5\times10^{-3}$ J, preferably from $6\times10^{-4}$ to $3\times10^{-3}$ J,
Energy Density=5 to 65 J/cm$^2$, preferably from 7 to 40 J/cm$^2$,
Pulse rate=0.5 to 50 kHz, preferably from 1 to 30 kHz,
Pulse width=50 to 300 nsec, preferably from 80 to 150 nsec,
Scan field=11.5×11.5 cm,
Scan velocity=3 m/sec (maximum), and
Repeatability in pulse to pulse jitter=~25% at high Q-switch rate (~30 kHz)<10% at low Q-switch rate (~1 kHz).

For imaging by means of "melting", essentially the laser set up conditions are basically the same as that of ablation conditions noted above, however whether the laser will operate in the ablation mode or in the melting mode will be determined by the dot frequency in a given scan area. It is also characterized by very low Q-switch rate (<1 kHz) slow writing speed (scan velocity of 30 to 1000 mm/sec) and wide pulse width (50 to 300 $\mu$sec).

The laser images can be easily erased from the zirconia surface. The printing tape is cleaned of printing ink in any suitable manner using known cleaning devices and procedures, and then the image is erased by either heating the surface in air or oxygen at an elevated temperature (temperatures of from about 150° to about 250° C. for a period of about 5 to about 60 minutes are generally suitable with a temperature of about 200° C. for a period of about 10 minutes being preferred) or by treating the surface with a $CO_2$ laser operating in accordance with the following parameters:

| | |
|---|---|
| Wave length: | 10.6 μm |
| Peak Power: | 300 watts (operated at 20% duty cycle) |
| Average Power: | 70 watts |
| Beam Size: | 500 μm with the beam width being pulse modulated. |

In addition to its use as a means for erasing the image, a $CO_2$ laser can be employed as a means of carrying out the imagewise exposure in the process employing an oleophilic to hydrophilic conversion.

Only the printing surface of the zirconia alloy ceramic is altered in the image-forming process. However, the image formed is a permanent image which can only be removed by means such as the thermally-activated or laser-assisted oxidation described herein.

Upon completion of a printing run, the printing surface of the printing tape can be cleaned of ink in any suitable manner and then the image can be erased and the plate can be re-imaged and used again. This sequence of steps can be repeated again and again as the printing tape is extremely durable and long wearing.

In the example provided below, the images were captured electronically with a digital flat bed scanner or a Kodak Photo CD. The captured images were converted to the appropriate dot density, in the range of from about 80 to about 250 dots/cm. These images were then reduced to two colors by dithering to half tones. A raster to vector conversion operation was then executed on the half-toned images. The converted vector files in the form of plot files were saved and were laser scanned onto the ceramic surface. The marking system accepts only vector coordinate instructions and these instructions are fed in the form of a plot file. The plot files are loaded directly into the scanner drive electronics. The electronically stored photographic images can be converted to a vector format using a number of commercially available software packages such as COREL DRIVE or ENVISION-IT by Envision Solutions Technology.

The invention is further illustrated by the following examples of its practice.

EXAMPLE 1:

Zirconia alloy ceramic printing tapes of this invention were prepared by any one of the following thick or thin film forming processes, either on a flexible substrate or as a monolithic web. The tape forming processes include thermal or plasma spraying, physical vapor deposition (PVD), such as ion beam assisted sputtering, chemical vapor deposition (CVD), sol-gel film forming techniques, tape casting, dip coating and slip casting. The noted methods and the appropriate choice of precursors are well known in the art. In certain experimental procedures, the tapes were formed as continuous webs.

In one instance, plasma spray/thermal spray methods were used, employing a PLASMADYNE SG-100 torch. Spraying was carried out on either 0.13 mm (5 mil) or 0.26 mm (10 mil) stainless steel substrates. The fine particle size distribution in the starting powder material exhibited considerable improvement in the sprayed printing tape density. Prior to spraying, the substrates were sand blasted to improve adhesion of sprayed zirconia alloy. Coating with the PLASMADYNE SG-100 torch produced uniform coating thickness throughout the length and width of the resulting printing tape.

In another embodiment, a physical vapor deposition (PVD) method, more specifically ion-beam assisted sputtering, was used to prepare zirconia alloy ceramic printing tapes. Further details of such PVD procedures are provided in U.S. Pat. No. 5,075,537 (Hung et al) and U.S. Pat. No. 5,086,035 (Hung et al), incorporated herein by reference with respect to the zirconia ceramic layer preparations.

The resulting zirconia alloy ceramic printing tapes were imaged using the procedure described in Example 2 below.

EXAMPLE 2:

Images containing half-tones through continuous tones were formed on several typical zirconia alloy ceramic printing tapes as described above. One surface of each printing tape was imaged by irradiation with a Nd-YAG laser emitting at 1.064 μm. Imaging was carried out on an off-white hydrophilic surface. In another embodiment, the entire printing surface was exposed with a Nd:YAG laser that turned the printing surface black (oleophilic) in color. The Nd:YAG laser was Q-switched and optically pumped with a krypton arc lamp. The spot size or beam diameter was approximately 100 μm in TEM (low order mode). The black oleophilic printing surface was imaged at either 0.488 or 10.6 μm to provide hydrophilic images.

EXAMPLE 3:

Several zirconia alloy ceramic printing tapes of this invention were prepared in the form of continuous webs by the plasma spray process as described above. Such printing tapes were wrapped around two drive rollers in a conventional printing press, as illustrated in FIG. 2. These printing tapes were imaged as described above in Example 2.

EXAMPLE 4:

A printing tape that was prepared and imaged as described in Example 2 above was used for printing in the following manner.

The imaged printing tape was cleaned with a fountain solution made up from Mitsubishi SLM-OD fountain concentrate. The concentrate was diluted with distilled water and isopropyl alcohol. Excess fluid was wiped away using a lint-free cotton pad. An oil-based black printing ink, Itek Mega Offset Ink, was applied to the printing tape by means of a hand roller. The ink selectively adhered to the imaged areas only. The image was transferred to plain paper by placing the paper over the plate and applying pressure to the paper.

EXAMPLE 5:

The printing tape described and used in Example 4 above was cleaned of printing ink, "erased" and reused in the following manner.

After cleaning off printing ink as described in Example 4, the printing tape was exposed to high heat (about 220° C.) to erase the image. The printing tape was then reimaged, reinked and reused for printing as described in the previous examples.

The invention has been described in detail, with particular reference to certain preferred embodiments thereof, but it should be understood that variations and modifications can be effected within the spirit and scope of the invention.

We claim:

1. A flexible lithographic printing tape having a printing surface composed of a zirconia ceramic that is an alloy of $ZrO_2$ and a secondary oxide selected from the group consisting of MgO, CaO, $Y_2O_3$, $Sc_2O_3$, a rare earth oxide, and a combination of any of these, said zirconia alloy ceramic having a density of from 5.6 to 6.2 g/cm$^3$, and said printing tape having an average thickness of less than about 5 mm.

2. The printing tape of claim 1 wherein the molar ratio of said secondary oxide to said zirconium oxide is from about 0.1:99.9 to about 25:75.

3. The printing tape of claim 1 wherein said zirconia alloy ceramic comprises a cubic, tetragonal or monoclinic form of zirconia, or a mixture of any two or more of said forms of zirconia.

4. The printing tape of claim 1 wherein said zirconia alloy is a zirconia-yttria ceramic.

5. The printing tape of claim 4 wherein the molar ratio of said secondary oxide to zirconia is from about 0.5:99.5 to about 5.0:95.0.

6. The printing tape of claim 4 wherein said zirconia alloy ceramic comprises zirconia in the tetragonal crystalline form.

7. The printing tape of claim 1 wherein said zirconia alloy ceramic has a density of 6.03 to 6.06 grams/cm$^3$ and a grain size of 0.1 to 0.6 mm.

8. The printing tape of claim 1 having an average thickness of from about 0.5 to about 5 mm.

9. The printing tape of claim 1 wherein said zirconia alloy ceramic is composed of a hydrophilic stoichiometric zirconia.

10. The printing tape of claim 1 wherein said zirconia alloy ceramic is composed of an oleophilic substoichiometric zirconia.

11. The printing tape of claim 1 having a porosity of up to 2%.

12. A method of imaging comprises the steps of:
   A) providing a flexible lithographic printing tape having a printing surface composed of a zirconia ceramic that is an alloy of $ZrO_2$ and a secondary oxide selected from the group consisting of MgO, CaO, $Y_2O_3$, $Sc_2O_3$, a rare earth oxide, and a combination of any of these, said zirconia alloy ceramic having a density of from 5.6 to 6.2 g/cm$^3$, and said printing tape having an average thickness of less than about 5 mm, and
   B) providing an image on said printing tape by imagewise exposing said printing surface to electromagnetic radiation that transforms said printing surface from a hydrophilic to an oleophilic state or from an oleophilic to a hydrophilic state, thereby creating a lithographic printing surface having both image areas and non-image areas.

13. The method of claim 12 wherein said printing tape is composed of a hydrophilic stoichiometric zirconia alloy ceramic, and said imagewise exposure of said printing surface provides oleophilic exposed image areas and hydrophilic non-exposed background areas.

14. The method of claim 12 wherein said printing tape is composed of an oleophilic substoichiometric zirconia alloy ceramic, and said imagewise exposure of said printing surface provides oleophilic non-exposed background areas and hydrophilic exposed image areas.

15. The method of claim 12 wherein said printing tape has a molar ratio of said secondary oxide to said zirconium oxide of from about 0.1:99.9 to about 25:75, and said zirconia is of the cubic, tetragonal, or monoclinic form, or is a mixture of any two of said forms.

16. The method of claim 12 wherein said printing tape is composed of a zirconia-yttria ceramic wherein the molar ratio of yttria to zirconia is from about 0.5:99.5 to about 5.0:95.0, and said zirconia is in the tetragonal crystalline form.

17. The method of claim 12 wherein said zirconia ceramic has a density of 6.03 to 6.06 grams/cm$^3$, and a grain size of 0.1 to 0.6 mm, and said printing tape has an average thickness of from about 0.5 to about 5 mm.

18. The method of claim 12 whrein said imaging is carried out using a laser having a power density of from about $30 \times 10^6$ to about $850 \times 10^6$ watts/cm$^2$.

19. A method of lithographic printing comprising the steps of:
   A) providing a flexible lithographic printing tape having a printing surface composed of a zirconia ceramic that is an alloy of $ZrO_2$ and a secondary oxide selected from the group consisting of MgO, CaO, $Y_2O_3$, $Sc_2O_3$, a rare earth oxide, and a combination of any of these, and said zirconia alloy ceramic having a density of from 5.6 to 6.2 g/cm$^3$, said printing tape having an average thickness of less than about 5 mm,
   B) providing an image on said printing tape by imagewise exposing said printing surface to electromagnetic radiation that transforms said printing surface from a hydrophilic to an oleophilic state or from an oleophilic to a hydrophilic state, thereby creating a lithographic printing surface having both image areas and non-image areas,
   C) contacting said lithographic printing surface with an aqueous fountain solution and a lithographic printing ink, thereby forming an inked lithographic printing surface, and
   D) contacting said inked lithographic printing surface with a substrate to thereby transfer said printing ink to said substrate, forming an image thereon.

20. The method of claim 19 further comprising cleaning the ink off said printing surface, and erasing said image.

21. The method of claim 20 wherein said image is erased by: either heating said cleaned printing surface at from about 150° to about 250° C. for up to 60 minutes, or exposing said cleaned printing surface to a carbon dioxide laser emitting at a wavelength of about 10.6 µm or to an argon laser gas emitting at a wavelength of about 0.488 µm.

* * * * *